United States Patent [19]

Sprague

[11] Patent Number: 5,148,381
[45] Date of Patent: Sep. 15, 1992

[54] ONE-DIMENSIONAL INTERPOLATION CIRCUIT AND METHOD BASED ON MODIFICATION OF A PARALLEL MULTIPLIER

[75] Inventor: David L. Sprague, Trenton, N.J.

[73] Assignee: Intel Corporation, Santa Clara, Calif.

[21] Appl. No.: 651,738

[22] Filed: Feb. 7, 1991

[51] Int. Cl.$^5$ ............................................... G06F 7/38
[52] U.S. Cl. .................................................. 364/723
[58] Field of Search ................... 364/723, 754, 715.01

[56] References Cited

U.S. PATENT DOCUMENTS

| | | | |
|---|---|---|---|
| 4,493,048 | 1/1985 | Kung et al. | 364/754 |
| 4,727,503 | 2/1988 | McWhirter | 364/754 X |
| 5,020,014 | 5/1991 | Miller et al. | 364/723 |

OTHER PUBLICATIONS

"Principles of CMOS VLSI Design", Weste and Eshraghica, Addison-Wesley, 1985, pp. 344, 345.
"Computer Arithmetic—Principles, Architecture, and Design", Kai Hwang, John Wiley and Sons, 1979, pp. 161-165.

*Primary Examiner*—Long T. Nguyen
*Attorney, Agent, or Firm*—Carl L. Silverman; William H. Murray; Frank M. Linguiti

[57] ABSTRACT

An interpolator array having a plurality of interpolator array cells is provided for receiving first and second input values to be interpolated and an interpolator weight term, to provide an interpolated output. A bit of each of the two input values to be interpolated is received by an interpolator array cell and applied to a selecting circuit within a cell of the interpolator array. Additionally, an interpolation weight bit of the interpolation weight term is applied to the selection circuit. The selecting circuit applies either the input bit of the first input value or the input bit of the second input value to an adder within the interpolator cell in accordance with the value of the interpolation weight bit. An interpolator array cell also receives a partial product input and a carry-in input and applies these additional inputs to the adder. The adder provides a partial product output and a carry-out in accordance with the applied inputs.

42 Claims, 6 Drawing Sheets

PRIOR ART

ONE-DIMENSIONAL INTERPOLATION CIRCUIT AND METHOD BASED ON MODIFICATION OF A PARALLEL MULTIPLIER

BACKGROUND OF THE INVENTION

1. Field of the Invention

This invention relates to the field of one-dimensional interpolation and in particular to one-dimensional interpolation requiring fewer mathematical operations or fewer interpolator circuit elements.

2. Background of the Invention

It is well known in the art to perform one-dimensional interpolation. One-dimensional interpolation involves the weighted summation of two values, for example, as expressed by the equation $I = xA + (1-x)B$. In this equation A and B are the two input values to be interpolated and x is the fractional weight term. The solution of this equation requires two add-/subtract operations and two multiplications.

It is known to rearrange this equation to reduce it to the following form: $I = x(A-B) + B$. When the basic one-dimensional interpolation equation is rearranged into this form, the solution of the interpolation requires one subtraction, one addition, and one multiplication. Thus this rearranged form requires one less multiplication. Because this rearranged form requires fewer mathematical operations, it is advantageous to design a circuit to solve the equation in this rearranged form. This advantage can be realized in the form of decreased space requirements on the semiconductor chip or in performing the interpolation more quickly using the same amount of space. However, it is desirable to further reduce the amount of space or time required to perform the interpolation.

It is also well-known in the art to provide parallel multipliers for multiplying binary numbers. A parallel multiplier is based on the observation that partial products in the multiplication process can be independently computed in parallel. For example, consider the unsigned binary integers A and B:

$$A = \sum_{i=0}^{m-1} A_i 2^i$$

$$B = \sum_{j=0}^{n-1} B_j 2^j.$$

The product is found by:

$$P_r = A_r B_r = \sum_{i=0}^{m-1} A_i 2^i \cdot \sum_{j=0}^{n-1} B_j 2^j$$

$$= \sum_{i=0}^{m-1} \sum_{j=0}^{n-1} (A_i B_j) 2^{i+j}$$

$$= \sum_{k=0}^{m+n-1} P_k 2^k$$

Thus $P_k$ are the partial product terms called the summands. There are mn summands, which are produced in parallel by a set of mn AND gates. For four bit values A and B, the expression above may be expanded into the partial products or summands set forth in Table 1.

TABLE 1

|       |       |          | $A_3B_0$ | $A_2B_0$ | $A_1B_0$ | $A_0B_0$ |
|-------|-------|----------|----------|----------|----------|----------|
|       |       | $A_3B_1$ | $A_2B_1$ | $A_1B_1$ | $A_0B_1$ |          |
|       | $A_3B_2$ | $A_2B_2$ | $A_1B_2$ | $A_0B_2$ |          |          |

TABLE 1-continued

| $A_3B_3$ | $A_2B_3$ | $A_1B_3$ | $A_0B_3$ |    |    |    |    |
|----------|----------|----------|----------|----|----|----|----|
| P7 | P6 | P5 | P4 | P3 | P2 | P1 | P0 |

An $n \times n$ multiplier requires $n(n-2)$ full adders, n half adders and $n^2$ AND gates. The worst case delay associated with such a multiplier is $(2n+1)\tau_g$, where $\tau_g$ is the worst case adder delay.

Figure 1:
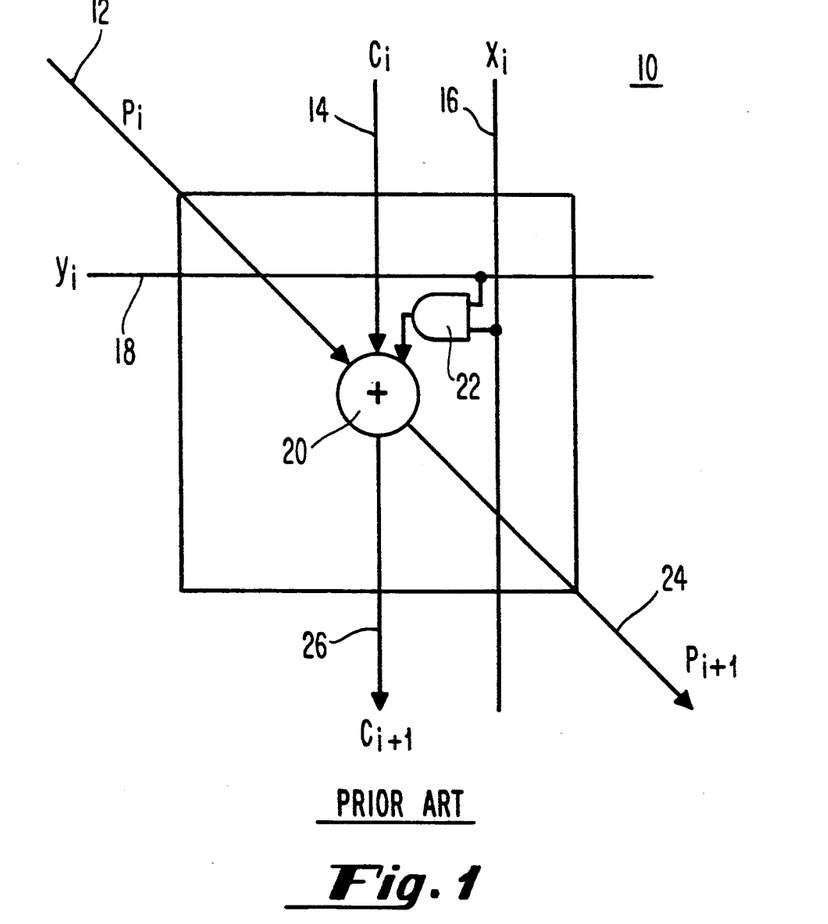
FIG. 1 is a schematic representation of a prior art cell which may be used to form a parallel multiplier.
Figure 2:
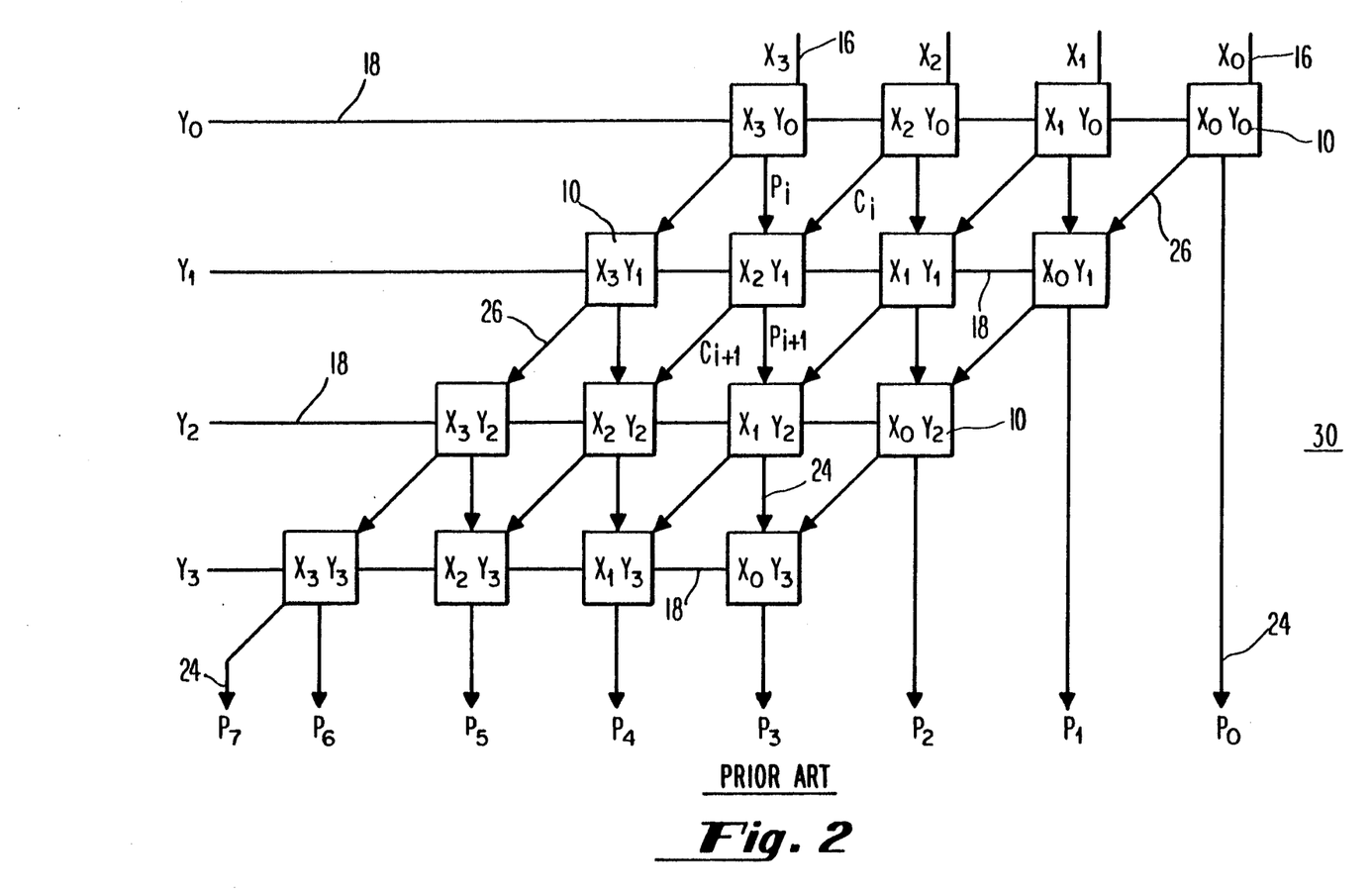
FIG. 2 shows a block diagram representation of a prior art parallel multiplier array formed of a plurality of the prior art cells of FIG. 1.

FIGS. 1, 2 show parallel multiplier cell 10 for forming parallel multiplier array 30 to provide, for example, the partial products or summands of Table 1. The $A_i$ term of value input line 16 of parallel multiplier cell 10 is propagated vertically, through cell 10. The $B_j$ term of value input line 18 of parallel multiplier cell 10 propagates horizontally through cell 10. Incoming partial product term $P_i$ enters at the top left of parallel multiplier cell 10 by way of partial product input line 12. Incoming carry-in values enter at the top left of parallel multiplier cell 10 by way of carry-in line 14.

A bit-wise AND of $A_i$ on value input line 16 and $B_j$ on value input line 18 is performed in parallel multiplier cell 10 by AND gate 22. The output of AND gate 22 and the incoming partial product term $P_i$ of partial product input line 12 are applied to adder 20 or summer 20. The output sum value of adder 20 is passed to a diagonally adjacent parallel multiplier cell 10 in the next row and the next column of parallel multiplier array 30 by way of partial product output line 24 at the lower right of parallel multiplier cell 10. The carry-out term of adder 20 is passed to the next vertically adjacent cell below parallel multiplier cell 10 in parallel multiplier array 30 by way of carry-out line 26.

Figure 3:
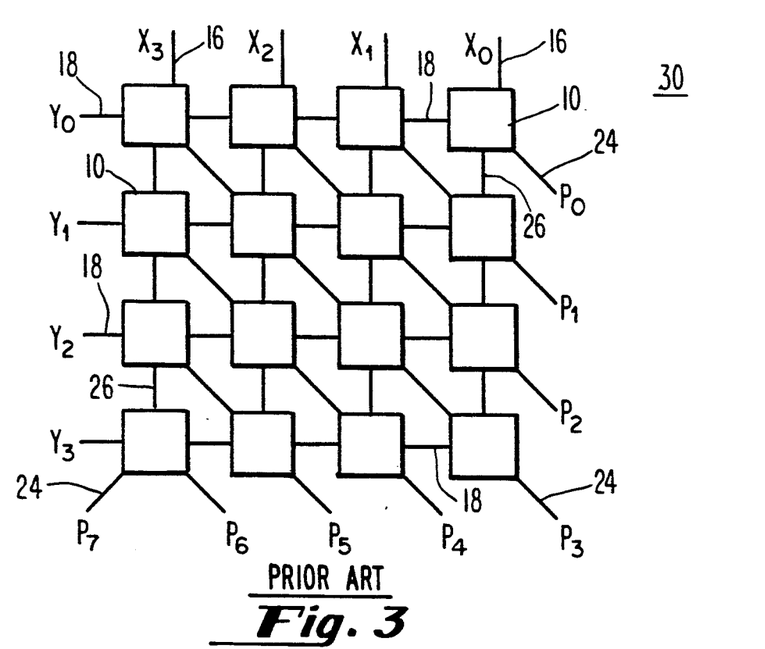
FIG. 3 shows a block diagram representation of the parallel multiplier array of FIG. 2 wherein the cells are arranged as a square array.

Parallel multiplier array 30 therefore is adapted to provide partial products, P0–P7, as set forth in Table 1. Thus parallel multiplier 30 is adapted to multiply two four-bit binary values. The partial product terms of the multiplication, P0–P7, are provided at parallel multiplier array 30 output lines 24. To perform the multiplication of input value A and input value B, the four bits of value A are applied to respective value input lines 16 of parallel multiplier array 30. The four bits of value B are applied to respective value input lines 18 of multiplier array 30. As show in FIG. 3, parallel multiplier array 30 may be redrawn as a square parallel multiplier array 30. A square parallel multiplier array 30 is the most convenient for implementation. Many other configurations for performing multiplication of binary values are also known in the art.

SUMMARY OF THE INVENTION

An interpolator array having a plurality of interpolator array cells is provided for receiving first and second input values to be interpolated and an interpolation weight term to provide an interpolator output. A bit of each of the two input values to be interpolated is received by an interpolator array cell and applied to a selection circuit within a cell of the interpolator array. Additionally, an interpolation weight bit of the interpolation weight term is applied to the selection circuit. The selection circuit applies either the bit of the first input value or the bit of the second input value to an adder within the interpolator cell in accordance with the value of the interpolation weight bit.

DETAILED DESCRIPTION OF THE INVENTION

One-dimensional interpolation involves the weighted sum of two values A and B as expressed by the equation:

$$I = xA + (1-x)B \tag{1}$$

where A and B are two binary values to be interpolated and x is the fractional weight term of the interpolation. Equation (1) requires two add/subtract operations and two multiplications. The one-dimensional interpolation of Equation (1) can be reduced to:

$$I = x(A-B) + B. \tag{2}$$

The $x(A-B)$ term of Equation (2) provides the offset of the interpolated value between the two input values A and B. The addition of B translates the offset value to provide the interpolation result.

The one-dimensional interpolation of Equation (2) requires one less multiplication than the interpolation of Equation (1) thereby permitting the interpolation of Equation (2) to be solved more quickly or with less circuitry than the interpolation of Equation (1). However, using the system of the present invention, the solution of a one-dimensional interpolation is further speeded up compared with the interpolation of Equation (2). In the system of the present invention, Equation (2) is further algebraically manipulated before it is implemented.

Assuming that the fractional weight term of the interpolation, x, is a four bit unsigned binary number, Equation (1) can be scaled by sixteen to give:

$$16I = 16xA - 16xB + 16B \tag{3}$$
$$= 16xA + (16 - 16x)B$$
$$= yA + (16 - y)B \tag{4}$$

where:

$$y = 16x \tag{5}$$

and y is a four bit unsigned integer with values from zero to fifteen. This scaling by sixteen can be undone by selecting the proper bits of the result of the interpolation. Thus y may be used as the interpolation weight term in the method and system of the present invention provided the proper bits of the result are selected.

Note that since interpolation weight term y is a four bit positive integer, $$16 - y = \alpha y + 1, \tag{6}$$

where $\alpha y$ is the one's complement of y wherein each bit of y is complemented. Substituting Equation (6) into the right hand side of Equation (4) provides:

$$16I = yA + \alpha yB + B. \tag{7}$$

In order to provide a circuit suitable for the implementation of Equation (7), the multiply operation for yA within Equation (7) is reviewed. If the four bits of weight term y are $y_3, y_2, y_1,$ and $y_0$, then yA becomes:

$$yA = y_0A + y_1(2A) + y_2(4A) + y_3(8A). \tag{8}$$

Since each bit of weight term y can only be a zero or a one, each term in Equation (8) is either equal to zero or nA where n is a power of two.

Further to the process of providing a circuit for performing the multiplication portion of Equation (7), the remaining terms of Equation (7) are examined:

$$yA + \alpha yB = (y_0A + \alpha y_0B) + (y_1(2A) + \alpha y_1(2B)) + \ldots \tag{9}$$

The operation performed in Equation (9) is similar to the operation performed in Equation (7) except that each term in Equation (9) is equal to either nA or nB depending on whether the corresponding bit of y is a one or a zero.

For example, if interpolation weight term y has the value five, the binary expression for y is $0101_2$, and Equation (7) becomes:

$$16I = A + 2B + 4A + 8B + B = 5A + 11B, \text{ or}$$

$$I = (5/16)A + (11/16)B.$$

An implementation of an interpolator based on Equation (7) is generally more hardware efficient than prior art implementations based on either Equation (1) or Equation (2). The implementation based on Equation (7) needs one less subtraction compared with the implementation of Equation (2) because the implementation of Equation (7) does not require the generation of the (A-B) term required by the implementation of Equation (2). The reason for the increase in efficiency provided by Equation (7) is that adders forming a multiplier in an implementation based on Equation (2) are not fully utilized when one or more bits of weight term y are equal to zero. In the case where one or more bits of y are equal to zero, the row of adders that corresponds to a zero bit of y simply passes the partial product on to the next stage. In the implementation of the present invention based on Equation (7), each stage of adders adds either an A term or a B term of the partial product. It will be understood by those skilled in the art that Equation (7) can be implemented by hardware or software.

Figure 4:
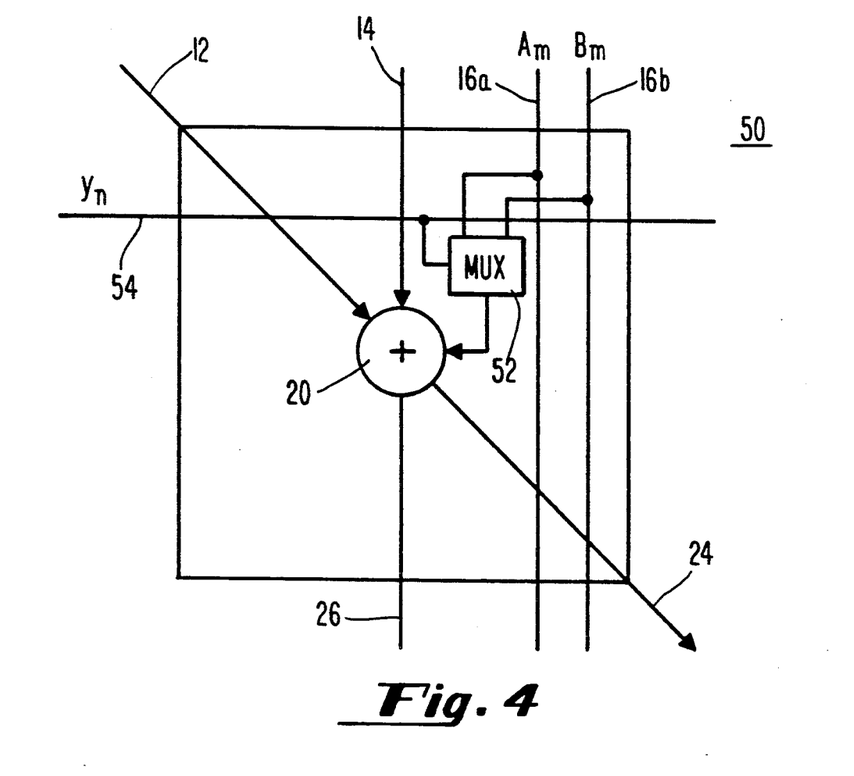
FIG. 4 shows a schematic representation of the one-dimensional interpolator cell of the present invention which forms the one-dimensional interpolation circuit of the present invention.

Referring now to FIG. 4, there is shown one-dimensional interpolator cell 50. One-dimensional interpolator cell 50 or one-dimensional interpolator 50 is suitable for implementing the $yA + \alpha yB$ portion of the interpolation of the present invention as set forth in Equation (7). In one-dimensional interpolator cell 50, bit $y_i$ of the interpolation weight term y is received by way of fractional weight line 18. Bit j of each of the two values to be interpolated, values A and B, are received by way of value input line 16a and value input line 16b respectively. Thus value bit $A_j$ is received by way of value input line 16a and value bit $B_j$ is received by way of value input line 16b. The partial product bit $P_i$ is received by interpolator cell 50 on incoming partial product line 12. The carry-in value is received by interpolator cell 50 by way of carry-in line 14 as previously described for prior art parallel multiplier cell 10. The outgoing partial product $P_{i+1}$ is transmitted from interpolator cell 50 by way of partial product output line 24 and the carry-out from summer 20 is transmitted by way of carry-out line 26, also as previously described with respect to prior art parallel multiplier cell 10.

Bit j of each of the input values A and B to be interpolated is applied to an individual input line of interpolator multiplexer 52 within one-dimensional interpolator cell 50. Interpolator multiplexer 52 applies either value $A_j$, received by way of value input line 16a, or value bit $B_j$, received by way of value input line 16b, to summer 20 by way of multiplexer output signal line 53. The determination of which value input bit $A_j$, $B_j$ is applied to summer 20 by interpolator multiplexer 52 is made in accordance with the value of interpolation weight bit $y_i$ of interpolation weight term y. The value of interpolation weight bit $y_i$ is applied to interpolator multiplexer 52 by way of interpolation weight bit line 18.

It will be understood by those skilled in the art, that one-dimensional interpolator cell 50 may be formed by modification of parallel multiplier cell 10. To perform this modification, AND gate 22 is removed and replaced with interpolator multiplexer 52, wherein the output of interpolator multiplexer 52 is applied to summer 20 in the same manner as the output of AND gate 22 within parallel multiplier cell 10. Two input lines 16a,b, rather than one, are provided in the modification of parallel multiplier cell 10 to form one-dimensional interpolator cell 50. Multiplexer 52, provided to form interpolation cell 50 by modification of multiplier cell 10, may be of a conventional type wherein two AND gates (not shown) receive the interpolation weight bit, one inverted and the other not inverted. Each of the AND gates also receives one of the input bits and the outputs of the AND gates are applied to an OR gate. It will be understood by those skilled in the art that such a multiplexer 52 behaves like AND gate 22 if one of the inputs is always zero.

Figure 5:
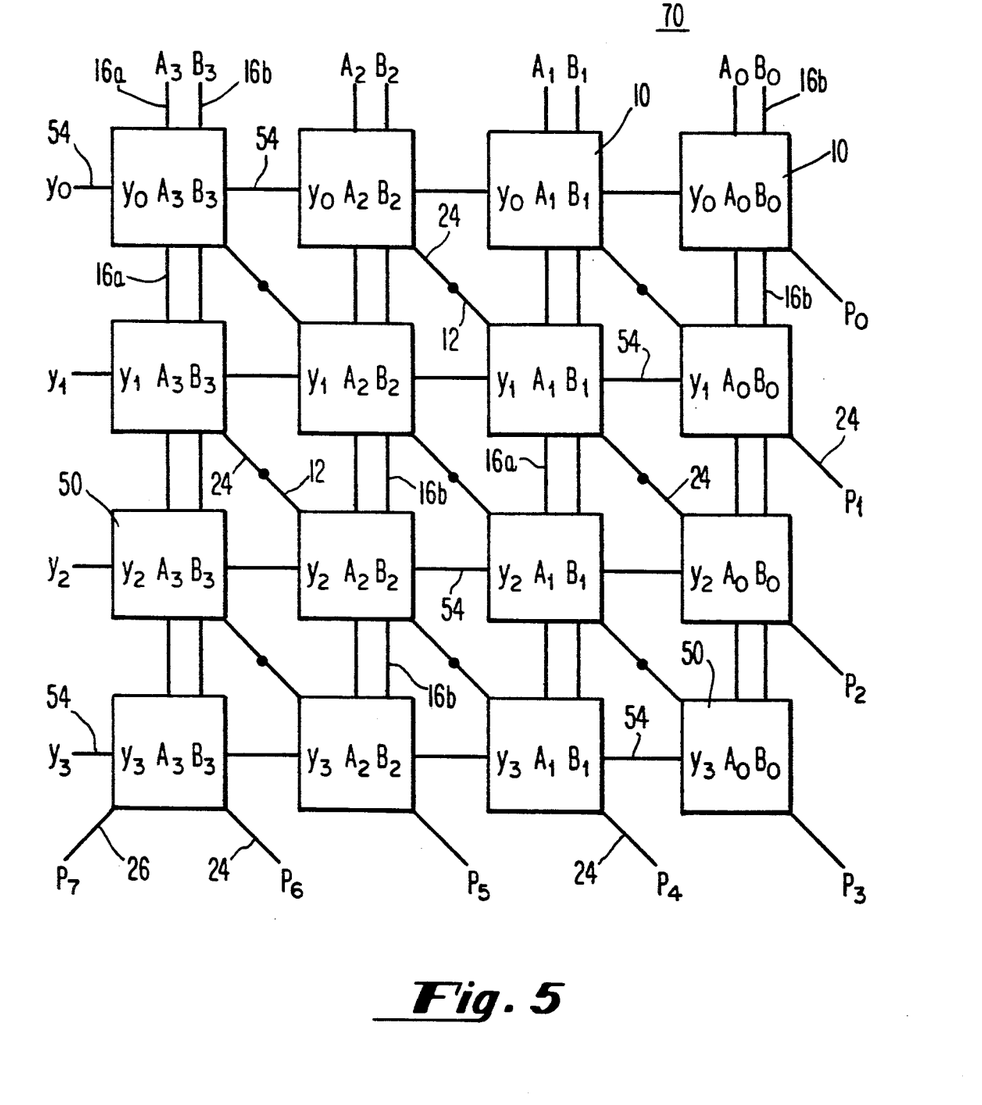
FIG. 5 shows a schematic representation of the one-dimensional interpolation circuit of the present invention formed of a plurality of the interpolator cells of FIG. 4 arranged as a square array.

It will also be understood by those skilled in the art, that other parallel multiplier cells (not shown), differing from parallel multiplier cell 10, may be modified in a similar manner to provide a one-dimensional interpolator cell (not shown) such as one-dimensional interpolator cell 50 provided that the required interpolator partial product terms are thereby produced. For example, the iterative cellular array multipliers taught by Kai Hwang in "Computer Arithmetic", ISBN 0-471-03496-7, may be modified to provide one-dimensional interpolator array 70 of the present invention. It will be understood that a multiplier cell having fewer gates than another will provide an interpolator cell having fewer gates.

Referring now to FIG. 5, there is shown one-dimensional interpolator array 70 of the present invention. One-dimensional interpolator array 70 is formed of a plurality of one-dimensional interpolator cells 50. To perform the one-dimensional interpolation of Equation (7), each bit of the interpolation weight term y is applied to a respective row of horizontally adjacent interpolator cells 50 within interpolator array 70. Each row of interpolator cells 50 of interpolator array 70 is provided with a respective interpolator weight bit line 18 for receiving an interpolator weight bit $y_i$ of interpolator weight term y and applying interweight bit $y_i$ to each horizontally adjacent interpolator cell 50 in the row.

Each bit of the input value A to be interpolated within one-dimensional interpolator array 70 is applied to a respective column of vertically adjacent interpolator cells 50 within one-dimensional interpolator array 70 by way of a respective value input line 16a. A bit of input value A applied to a column of interpolator cell 50 by a single value input line 16a is applied to a respective interpolator multiplexer 52 of each interpolator cell 50 in the column by value input line 16a. Each bit of the input value B to be interpolated within one-dimensional interpolator array 70 is applied to a respective column of vertically adjacent interpolator cells 50 within interpolator array 70 by way of a respective value line 16b. Thus each value line 16b applies its input value bit to the multiplexer 52 of each cell 50 in its respective column. Thus, the bit of input value B applied to a column of interpolator cells 50 by a single value input line 16b is applied to a respective interpolator multiplexer 52 of each interpolator cell 50 in the column by value input line 16b in the same manner as value input line 16a.

The output partial product terms P0–P7 of the resulting interpolation value are provided by one-dimensional interpolator array 70 at partial product output lines 24. For four bit values A and B, the partial product terms P0–P7 of one-dimensional interpolator array 70 are set forth in Table 2.

TABLE 2

|  |  |  |  | $[A_3B_3]y_0$ | $[A_2B_2]y_0$ | $[A_1B_1]y_0$ | $[A_0B_0]y_0$ |
|  |  |  | $[A_3B_3]y_1$ | $[A_2B_2]y_1$ | $[A_1B_1]y_1$ | $[A_0B_0]y_1$ | |
|  |  | $[A_3B_3]y_2$ | $[A_2B_2]y_2$ | $[A_1B_1]y_2$ | $[A_0B_0]y_2$ | | |
|  | $[A_3B_3]y_3$ | $[A_2B_2]y_3$ | $[A_1B_1]y_3$ | $[A_0B_0]y_3$ | | | |
| P7 | P6 | P5 | P4 | P3 | P2 | P1 | P0 |

The partial product terms within one-dimensional interpolator array 70 are transmitted between diagonally adjacent interpolator cells 50 by way of partial product lines 24 which apply the outgoing cell partial products to incoming cell partial product lines 12 of diagonally adjacent interpolator cells 50. Because the interpolation weight bit $y_i$ of each row of interpolator array 70 controls the multiplexing of bits $A_j$ and $B_j$ by means of multiplexer 52 within each row of interpolator array 50, the interpolation weight term y determines the partial product terms provided on the diagonal paths of one-dimensional interpolator array 70 formed by partial product lines 12, 24.

The first row of one-dimensional interpolator array 70 may be formed of parallel multiplier cells 10 rather than one-dimensional interpolator cells 50. Conventional parallel multiplier cells 10 having full adders 22 are sufficient for the first row of one-dimensional interpolator array 70 because no carry-in is required in the first row. The bits of input value B may be therefore be applied to carry-in lines 14 of the first row of interpolator array 70 to perform the +B operation set forth in Equation (7). In order to simplify the drawing of one-dimensional interpolator array 70, carry-in lines 14 and carry-out lines 26 are not shown. It will be understood by those skilled in the art that carry-in lines 14 and carry-out lines 26 of vertically adjacent interpolation cells 50 are coupled in each column of interpolation array 70.

Figure 6:
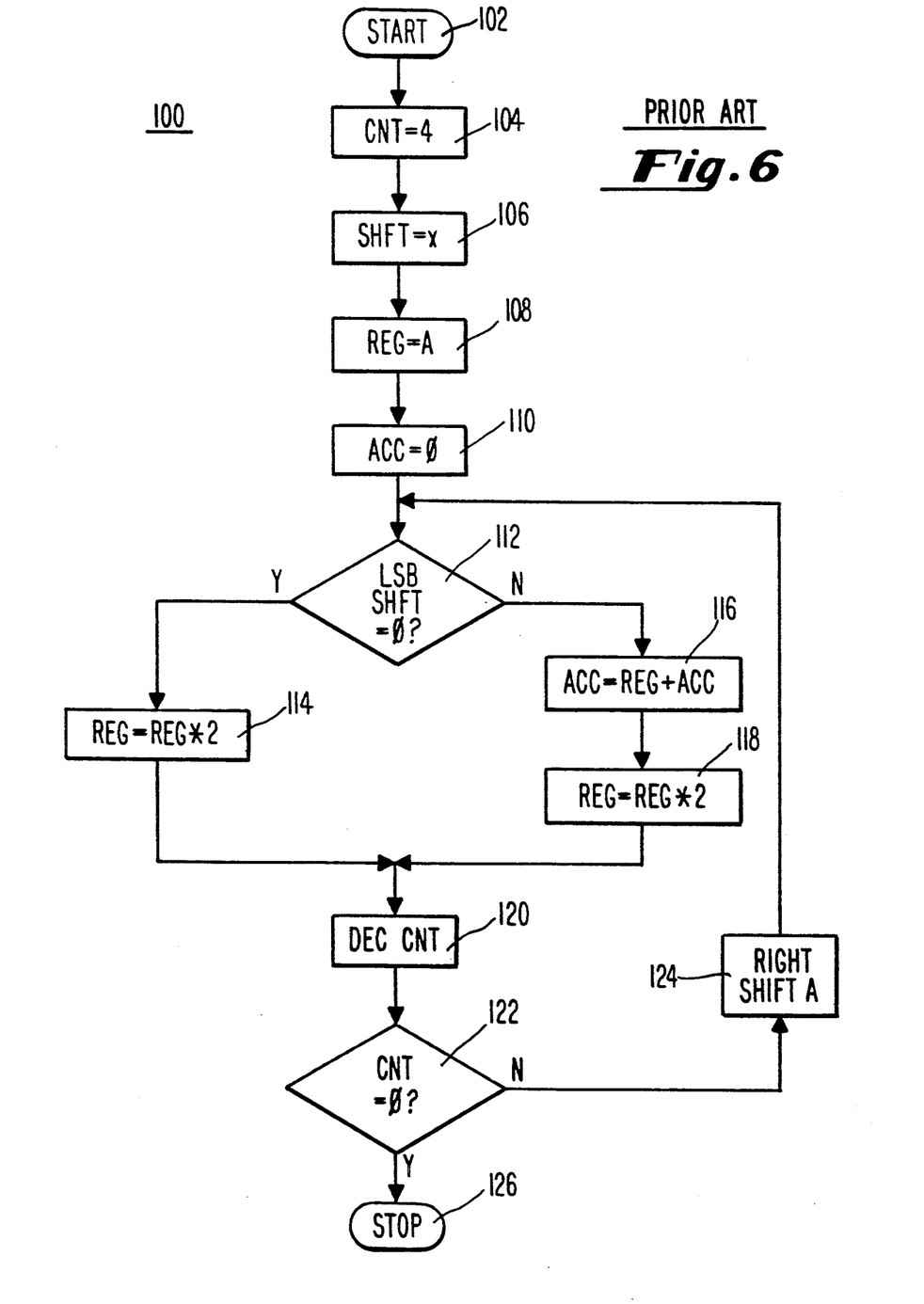
FIG. 6 shows a flow chart representation of a prior art method of performing a multiplication of two binary values.

Referring now to FIG. 6, there is shown a flow chart representation of prior art multiplication algorithm 100 for a performing a multiplication of two binary values. Prior art multiplication algorithm 100 is adapted, in particular, to multiply two four-bit binary values, x and A. However, it will be understood by those skilled in the art that multiplication algorithm 100 may be adapted to multiply binary values of varying lengths. Execution of multiplication algorithm 100 proceeds from start 102 to block 104 where a counter is initialized to the value four where four is the length of binary values y and A. In block 106 a shift register is initialized to the value of y, where y is defined within multiplication algorithm 100 as one of the values to be multiplied. In block 108 register REG is initialized to the other input binary value, binary value A. The accumulator is then initialized to zero as shown in block 110.

At decision 112 a determination is made whether the least significant bit of the shift register containing the binary value y is zero. If it is determined at decision 112 that the least significant bit of the shift register is zero, register REG is shifted to the right by multiplying REG by two as shown in block 114. The counter is then decremented at block 120 and a determination is made at decision 122 whether the counter has been decremented to zero. If the counter has been decremented to zero as determined at decision 122, execution of multiplication algorithm 100 proceeds to terminal 126 and multiplication algorithm 100 is complete. Thus, if the least significant bit of the shift register containing the binary value y is zero, as determined by decision 112, register REG is shifted to the right and no additional value is accumulated in the accumulator.

If the least significant bit of the shift register containing the binary value y is one, as determined by decision 112, the contents of REG are accumulated by adding REG to the accumulator as shown in block 116. Register REG is shifted to the right in block 118 by multiplying REG by two as previously described with respect to block 114. The counter is then decremented as shown in block 120 and tested in decision 124. If the counter is not zero, the binary value y, contained in shift register SHFT, is shifted one bit to the right and execution of algorithm 100 returns to block 112 where the least significant bit of the shifted binary value y is again tested.

Thus, whether the least significant bit of the shift register containing y is zero or one, register REG is shifted one bit to the right during each pass through multiplication algorithm 100. However, only if the least significant bit of the shift register is one does multiplication algorithm 100 require adding the contents register REG to the accumulator. In this manner a conventional multiplication of the binary values y and A is performed by multiplication algorithm 100.

Figure 7:
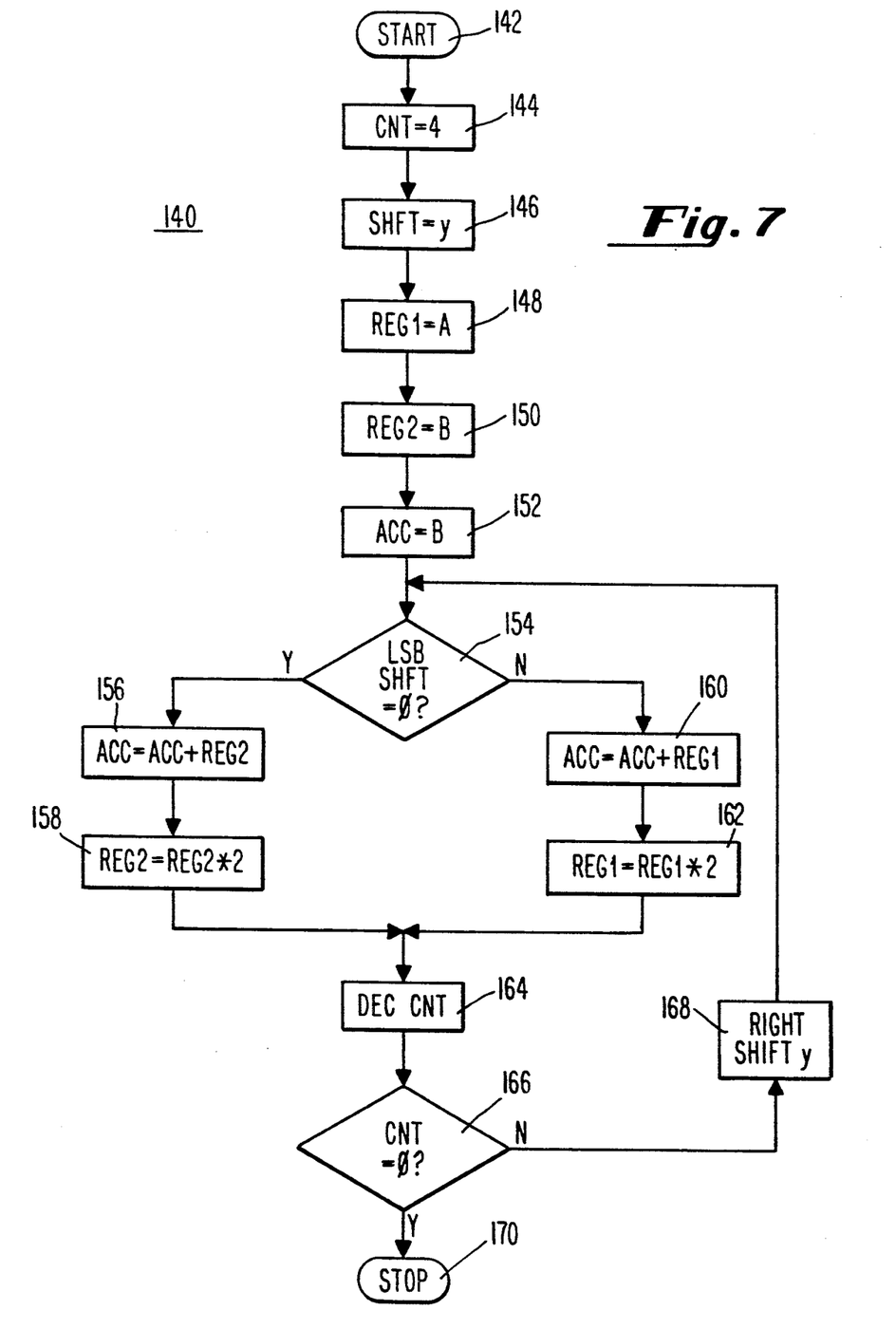
FIG. 7 shows a flow chart representation of the one-dimensional interpolation method of the present invention.

Referring now to FIG. 7, there is shown a flow chart representation of interpolation algorithm 140 for performing the interpolation method of the present invention. Interpolation algorithm 140 of the present invention is adapted to perform an interpolation as set forth in Equation (7) by means of software operations corresponding to the logic of one-dimensional interpolator array 70.

Execution of interpolation algorithm 140 begins at start terminal 142 and proceeds to block 144 where a counter is initialized to four. In block 146, a shift register, SHFT, is initialized to the binary value y. The binary value y is the interpolation weight term. Equation (5) sets forth the relationship between interpolation weight term y and the fractional weight term x of the interpolation of value A and value B defined in Equation (1) In block 148, REG1 is initialized to the interpolation input value A and in block 150 REG2 is initialized to the interpolation input value B. In block 152, the accumulator is initialized to B in order to perform the +B operation of Equation (7) thereby translating the interpolation offset value to provide the interpolation result.

At decision 154 a determination is made whether the least significant bit of the fractional weight term in the shift register SHFT is zero. If the state of the least significant bit of the fractional weight term is zero, as determined in decision 154, then the contents of REG2, input value A, are accumulated by adding REG2 to the accumulator as shown in block 156. REG2 is then shifted to the right as shown in block 158. If the least significant bit of the fractional weight term is one, as determined by decision 154, REG1 rather than REG2 is accumulated by adding REG1 to the accumulator as shown in block 160. In this case, REG1 rather than REG2 is shifted to the right as shown in block 162.

Thus, the accumulation and shifting operations of blocks 156, 158 are performed on the contents of REG2, input value B, when the interpolation weight bit is zero, and the same accumulation and shifting operations, as set forth in blocks 160, 162, are performed upon the contents of REG1, input value A, when the interpolation weight bit is one. Therefore, decision 154 and blocks 156-162 perform the operations set forth for interpolator multiplexer 52 and summer 20 of one-dimensional interpolation cell 50. In one-dimensional interpolator cell 50 either input bit $A_j$ on input line 16a, or input value $B_j$ on input line 16b, is applied to summer 20 in accordance with the interpolation weight bit $y_1$ which controls interpolator multiplexer 52.

In block 164 of interpolation algorithm 140, the counter is decremented and a determination is made at decision 166 whether the counter is decremented to zero. If the counter is decremented to zero, as determined in decision 166, execution proceeds to terminal 170 and algorithm 140 is complete. If the counter is not decremented to zero, the interpolation weight term y is shifted to the right in block 168. After the shifting of block 168, execution of interpolation algorithm 140 proceeds to decision 154 where a determination is again made whether the least significant bit of the interpolation weight term is zero or one. It will be understood by those skilled in the art that the interpolation method of interpolation algorithm 140 may be performed with a left shift rather than a right shift at block 168 provided that the most significant bit of SHFT is tested in decision 154 rather than the least significant bit.

It will be understood that various changes in the details, materials and arrangement of the parts which have been described and illustrated in order to explain the nature of this invention may be made by those skilled in the art without departing from the principle and scope of the invention as expressed in the following claims.

I claim:

1. An interpolator having means for receiving a first input value having first input value bits, a second input value having second input value bits, and an interpolation weight term having interpolation weight bits, to interpolate said first and second input values and provide an interpolation output value, said interpolator being formed of a plurality of interpolator cells, each interpolation cell having summing means for providing a summing means output value in accordance with summing means input values applied to said summing means, comprising:

respective selection means coupled to each of said summing means for receiving a first input value bit, a second input value bit, and an interpolation weight bit to provide a selected output signal representative of a selected one of said first and second input value bits in accordance with said interpolation weight bit;

means for applying said selected output signal to said summing means to provide a summing means output value representative of said interpolation output value; and, a one-dimensional interpolator array of said interpolator cells arranged in array rows and array columns, an array row having a plurality of horizontally adjacent interpolator cells and an array column having a plurality of vertically adjacent interpolator cells, and an interpolator cell having diagonally adjacent interpolator cells wherein a diagonally adjacent interpolator cell is disposed in a differing array row and in a differing array column.

2. The interpolator of claim 1, wherein said summing means further comprises:

means for receiving a first incoming interpolator cell partial product term; and, means for providing a second outgoing interpolator cell partial product term in accordance with summing means input values including said first incoming interpolator cell partial product term.

3. The interpolator of claim 1, wherein said summing means further comprises:

means for receiving a first incoming interpolator cell carry-in term; and, means for providing a second outgoing interpolator cell carry-out term in accordance with summing means input values including said first incoming interpolator cell carry-in term.

4. The interpolator of claim 1 further comprising:

means for applying each of said first input value bits of said first input value to a respective plurality of vertically adjacent interpolator cells forming a respective array column;

means for applying each of said second input value bits of said second input value to a respective plurality of vertically adjacent interpolator cells forming a respective array column; and, means for applying each interpolation weight bit of said interpolation weight term to a respective plurality of horizontally adjacent interpolator cells forming a respective array row.

5. The one-dimensional interpolator of claim 4 further comprising:

means for receiving a first incoming interpolator cell partial product term; and, means for providing a second outgoing interpolator cell partial product term in accordance with summing means input values including said first incoming interpolator cell partial product term.

6. The interpolator of claim 5, further comprising means for applying said second outgoing interpolator cell partial product term of a first interpolator cell to said means for receiving said first incoming interpolator cell partial product term of a second diagonally adjacent interpolator cell.

7. The one-dimensional interpolator of claim 4, wherein said summing means further comprises:

means for receiving a first incoming interpolator cell carry-in term; and, means for providing a second outgoing interpolator cell carry-out term in accordance with summing means input values including said first incoming interpolator cell carry-in term.

8. The interpolator of claim 7, further comprising means for applying said second outgoing interpolator cell carry-out term of a first interpolator cell to said means for receiving a first incoming interpolator cell carry-in term of a second vertically adjacent interpolator cell.

9. An interpolation method for receiving a first input value having first input value bits, a second input value having second input value bits, and an interpolation weight term having interpolation weight bits, to interpolate said first and second input values and provide an interpolator output value in an interpolator formed of a plurality of interpolator cells, each interpolator cell of said plurality of interpolator cells having selecting means and summing means for providing a summing means output value in accordance with summing means input values applied to said summing means, comprising the steps of:

(a) arranging a plurality of said interpolator cells in an array having array rows and array columns, an array row having a plurality of horizontally adjacent interpolator cells and an array column having plurality of vertically adjacent interpolator cells, and an interpolator cell having diagonally adjacent interpolator cells wherein a diagonally adjacent interpolator cell is disposed in a differing row and in a differing column;

(b) applying a bit of said first input value bits, a bit of said second input value bits and a bit of said interpolation weight bits to each of said selecting means;

(c) providing a selecting means output signal representative of a selected one of said first and second input value bits in accordance with said interpolation weight bit; and, (d) applying said selecting means output signal to said summing means.

10. The interpolation method of claim 9, comprising the further steps of:

(e) applying a first incoming interpolator cell partial product term to said summing means; and, (f) providing a second outgoing interpolator cell partial product term in accordance with summing means input values including said first incoming interpolator cell partial product term.

11. The interpolation method of claim 10, comprising the further steps of:

(g) applying a first incoming interpolator cell carry-in term to said summing means; and, (h) providing a second outgoing interpolator cell carry-out term in accordance with summing means input values including said first incoming interpolator cell carry-in term.

12. The interpolation method of claim 9, comprising the further steps of:
   (i) applying each of said first input value bits of said first input value to a respective plurality of vertically adjacent interpolator cells forming an array column;
   (j) applying each of said second input value bits of said second input value to a respective plurality of vertically adjacent interpolator cells forming an array column; and,
   (k) applying each interpolation weight bit of said interpolation weight term to a respective plurality of horizontally adjacent interpolator cells forming an array row.

13. The interpolation method of claim 12, comprising the further steps of:
   (l) receiving a first incoming interpolator cell partial product term by receiving means of said interpolator cell;
   (m) applying said first incoming interpolator cell partial product term to said summing means; and,
   (n) providing a second outgoing interpolator cell partial product term in accordance with summing means input values including said first incoming interpolator cell partial product terms.

14. The interpolation method of claim 13, comprising the further step of applying said second outgoing interpolation cell partial product term of a first interpolator cell to said means for receiving said first incoming interpolator partial product term of a second diagonally adjacent interpolator cell.

15. The interpolation method of claim 13, comprising the further steps of:
   (o) receiving a first incoming interpolator cell carry-in term by receiving means of said interpolator cell;
   (p) applying said first incoming interpolator cell carry-in term to said summing means; and,
   (q) providing a second outgoing interpolator cell carry-out term in accordance with summing means input values including said first incoming interpolator cell carry-in term.

16. The interpolation method of claim 15, comprising the further step of applying said second outgoing interpolation cell carry-out term of a first interpolator cell to said means for receiving said first incoming interpolator cell carry-in term of a second vertically adjacent interpolator cell.

17. An interpolator for receiving first and second input values and an interpolation weight value, each of said values having a current shifted value, said current shifted interpolation weight value having a predetermined number of interpolation weight bits and a current test bit, to interpolate said first and second input values and provide an interpolation output value, comprising;
   means for first determining the state of said current test bit of said current shifted interpolation weight value to provide an interpolation weight test signal in response to said determination;
   selecting means coupled to said means for first determining, said selecting means having means for receiving said interpolation weight signal from said means for first determining and selecting one of said first and second input values in accordance with said received interpolation weight signal;
   accumulating means coupled to said selecting means for accumulating said current shifted values in accordance with said selected one of said first and second input values;
   input value shifting means coupled to said first determining means for receiving said first interpolation weight signal and shifting said first and second current shifted input values in accordance with said received interpolation weight test signal to provide new first and second current shifted input values;
   weight value shifting means for shifting said interpolation weight value to provide a new current shifted interpolation weight value having a new current test bit;
   means coupled to said weight value shifting means for second determining when the state of all of said predetermined number of interpolation test bits are determined; and,
   means for providing an output signal representative of an interpolation of said first and second input values in accordance with said means for second determining.

18. The interpolator of claim 17, wherein said accumulating means comprises means for accumulating only a selected one of said first and second current shifted input values in accordance with said interpolation weight test signal.

19. The interpolator of claim 18, wherein said input value shifting means comprises means for shifting only a selected one of said first and second current shifted input values in accordance with said interpolation weight test signal.

20. The interpolator of claim 19, wherein said current test bit comprises the least significant bit of said current shifted interpolation weight value.

21. The interpolator of claim 20, wherein input value shifting means comprises shifting only a selected one of said first and second current shifted input values to the right.

22. The interpolator of claim 19, wherein said current test bit comprises the most significant bit of said current shifted interpolation weight value and said weight value shifting means comprises means for shifting said selected one of said current shifted input values to the left.

23. The interpolator of claim 17, further comprising means for accumulating one of said first and second input values.

24. The interpolation of claim 17, wherein said means for further accumulating comprises means for initializing said means for accumulating to contain one of said first and second values.

25. An interpolation method for receiving first and second input values and an interpolation weight value, each of said values having a current shifted value, said current shifted interpolation weight value having a current test bit with a test bit state, to interpolate said first and second input values and provide an interpolation output value in a system having means for accumulating and shifting each of said values, comprising the steps of:
   (a) determining said test bit state of said current test bit of said current shifted interpolation weight value and providing an interpolation weight test signal in response to said determination;
   (b) applying said interpolation weight signal to said accumulating means and said shifting means;
   (c) activating said accumulating means in accordance with said interpolation weight test signal to accumulate said current shifted values of said first and second input values;

(d) activating said shifting means in accordance with said interpolation weight test signal to shift said first and second current shifted input values and provide new first and second current shifted input values;

(e) activating said shifting means to shift said interpolation weight value for providing a new current shifted interpolation weight value having a new current test bit;

(f) repeating steps (a)–(d) until said interpolation is complete and an interpolation result is determined;

(g) providing an output signal representative of said interpolation result.

26. The interpolation method of claim 25, wherein step (c) comprises accumulating only a selected one of said first and second current shifted input values in accordance with said interpolation weight test signal.

27. The interpolation method of claim 26, wherein step (d) comprises shifting only a selected one of said first and second current shifted input values in accordance with said interpolation weight test signal.

28. The interpolation method of claim 27, wherein said current test bit comprises the least significant bit of said current shifted interpolation weight value.

29. The interpolation method of claim 28, wherein step (d) comprises shifting a selected one of said first and second current shifted input values to the right.

30. The interpolation method of claim 27, wherein said current test bit comprises the most significant bit of said current shifted interpolation weight value and step (e) comprises shifting a selected one of said current shifted input values to the left.

31. The interpolation method of claim 25, comprising the further step of further accumulating one of said first and second input values.

32. The interpolation method of claim 31, wherein the step of further accumulating comprises initializing said means for accumulating to contain one of said first and second input values.

33. A method for forming an interpolator cell by modification of a parallel multiplier cell of a parallel multiplier array, said parallel multiplier array being formed of a plurality of multiplier cells, each multiplier cell having logical AND means for receiving first and second input bits of respective first and second input values and summing means for receiving the output of said logical AND means, said formed interpolator array being provided with a plurality of array inputs to receive said first and second input values and an interpolation weight term having interpolation bits to provide an interpolator cell output, comprising the steps of:

(a) deactivating said logical AND means;

(b) providing selecting means having first and second input means for receiving said first and second input bits and selection output means for providing a selecting means output signal;

(c) controlling said selecting means to provide a selected one of said first and second input bits as said selecting means output signal in accordance with one of said interpolation weight bits; and, (d) applying said selecting means output signal to said summing means to provide said modified multiplier cell for forming an interpolator cell.

34. The method for forming an interpolator cell of claim 33, wherein said selecting means comprises multiplexing means.

35. The method for forming an interpolator cell of claim 33, comprising the further steps of;

(e) applying a first incoming interpolator cell partial product term to said summing means; and, (f) providing a second outgoing interpolator cell partial product term in accordance with summing means input values including said first incoming interpolator cell partial product term.

36. The method for forming an interpolator cell of claim 35, wherein a partial product term of said parallel multiplier cell and said partial product term of said modified multiplier cell differ from each other according to a difference between (1) $A_i B_j$ and (2) the selected value of $A_i$ and $B_i$ where said selected value is selected in accordance with $y_j$, where A and B are said first and second input values and y is said interpolation weight term, where i and j are positive integers for indicating arbitrary bit positions.

37. The method for forming an interpolation cell of claim 33, comprising the further steps of:

(g) applying a first incoming interpolator cell carry-in term to said summing means; and, (h) providing a second outgoing interpolator cell carry-out term in accordance with summing means input values including said first incoming interpolator cell carry-in term.

38. The method for forming an interpolator cell of claim 33, comprising the further step of arranging a plurality of said modified multiplier cells in an array having array rows and array columns, an array row having a plurality of horizontally adjacent modified multiplier cells and an array column having a plurality of vertically adjacent modified multiplier cells, and modified multiplier cell having diagonally adjacent modified multiplier cells, wherein a diagonally adjacent modified multiplier cell is disposed in a differing row and in a differing column.

39. The method for forming an interpolator cell of claim 38, comprising the further steps of:

(i) applying each of said first input value bits of said first input value to a respective plurality of vertically adjacent modified multiplier cells forming an array column;

(j) applying each of said second input value bits of said second input value to a respective plurality of vertically adjacent interpolator cells forming an array column; and, (k) applying each interpolation weight bit of said interpolation weight term to a respective plurality of horizontally adjacent modified multiplier cells forming an array row.

40. The method for forming an interpolator cell of claim 33, wherein steps (a) and (b) comprise the steps of:

(l) providing first and second logical AND means;

(m) applying one of said interpolation weight bits, inverted to an input of one of said first and second logical AND means and uninverted to the other of said first and second logical AND means.

41. The method for forming an interpolator cell of claim 40, comprising the further steps of:

(n) applying one of said first and second input bits to each of said first and second logical AND means; and, (o) applying the output of each of said first and second logical AND means to the input of logical OR means.

42. The method for forming an interpolator cell of claim 41, comprising the step of applying the output of said logical OR means to said summing means.

* * * * *